(12) United States Patent
Kindbeiter et al.

(10) Patent No.: US 9,625,096 B2
(45) Date of Patent: Apr. 18, 2017

(54) METHOD FOR FILLING A GAS STORAGE TANK

(75) Inventors: Francis Kindbeiter, Pia (FR); Laurent Rigaud, Pia (FR)

(73) Assignee: COLDWAY, Pia (FR)

( * ) Notice: Subject to any disclaimer, the term of this patent is extended or adjusted under 35 U.S.C. 154(b) by 382 days.

(21) Appl. No.: 14/233,428

(22) PCT Filed: Aug. 2, 2012

(86) PCT No.: PCT/FR2012/051841
§ 371 (c)(1),
(2), (4) Date: Mar. 31, 2014

(87) PCT Pub. No.: WO2013/024224
PCT Pub. Date: Feb. 21, 2013

(65) Prior Publication Data
US 2014/0202587 A1    Jul. 24, 2014

(30) Foreign Application Priority Data

Aug. 12, 2011    (FR) .................................... 11 02515

(51) Int. Cl.
*F17C 11/00*    (2006.01)
*F17C 5/06*    (2006.01)
*C01C 1/00*    (2006.01)
*C01B 3/00*    (2006.01)

(52) U.S. Cl.
CPC ............... *F17C 5/06* (2013.01); *C01B 3/001* (2013.01); *C01C 1/006* (2013.01); *F17C 11/00* (2013.01); *F17C 11/005* (2013.01); *Y02E 60/324* (2013.01)

(58) Field of Classification Search
CPC ......... C01B 3/001; C01C 1/006; F17C 11/00; F17C 11/005; F17C 5/06; Y02E 60/324
USPC ......... 95/90, 128; 96/108; 206/0.7; 502/526; 423/352
See application file for complete search history.

(56) References Cited

U.S. PATENT DOCUMENTS

| 5,441,716 A | 8/1995 | Rockenfeller |
| 5,653,951 A | 8/1997 | Rodriguez et al. |
| 7,297,181 B2 * | 11/2007 | Zhou ...................... B01D 53/02 203/DIG. 16 |

(Continued)

FOREIGN PATENT DOCUMENTS

| DE | 10 2006 052 109 A1 | 5/2008 |
| FR | 1 502 818 A | 11/1967 |

(Continued)

*Primary Examiner* — Frank Lawrence
(74) *Attorney, Agent, or Firm* — Sughrue Mion, PLLC

(57) ABSTRACT

The invention relates to a method for filling a tank (1) with a gas in gaseous phase in order to store said gas in solid phase, in which the gas is introduced into the tank (1) at either: a filling pressure (Pr) equal to the equilibrium pressure of a reactant product at a filling temperature plus α times the difference between the saturation vapor pressure (PS) of the gas at the filling temperature (Tr) and the equilibrium pressure of the reactant product, α being between 0.1 and 0.9; or a filling temperature (Tr) equal to the vaporization temperature of the gas at the filling pressure (Pr) plus β times the difference between the equilibrium temperature (Te) of the reactant product at the filling pressure (Pr) and the vaporization temperature of the gas, β being between 0.1 and 0.9.

15 Claims, 2 Drawing Sheets

(56) References Cited

U.S. PATENT DOCUMENTS

Figure 1:
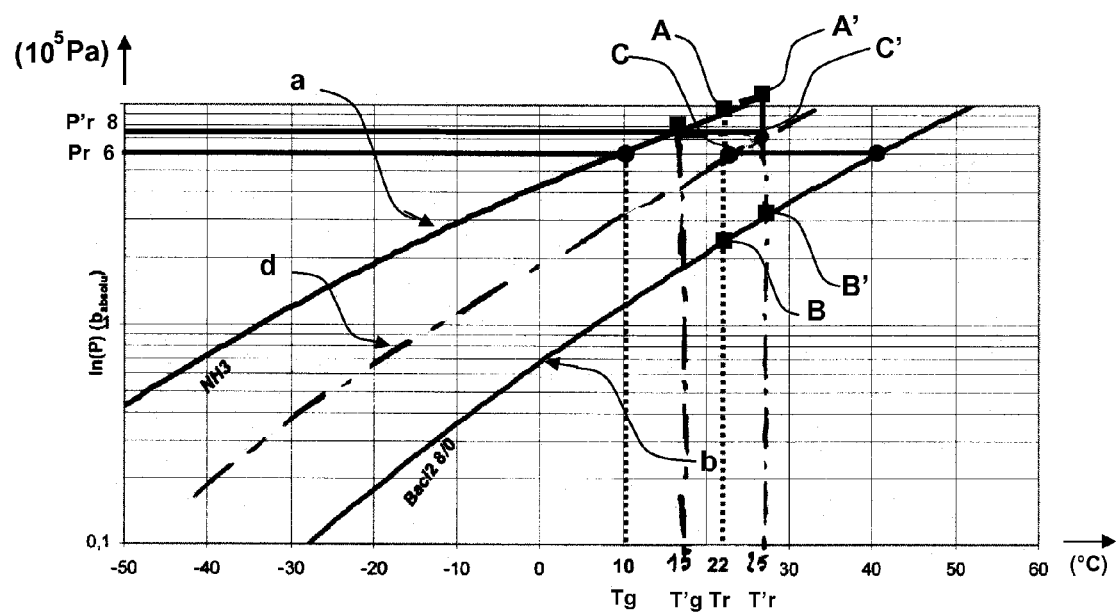

| | | | |
|---|---|---|---|
| 8,636,834 B2* | 1/2014 | Fruchart | C01B 3/0005 206/0.7 |
| 2002/0014277 A1* | 2/2002 | Togasawa | F16K 17/30 141/95 |
| 2006/0101997 A1* | 5/2006 | Py | B01D 53/02 95/96 |
| 2010/0089070 A1 | 4/2010 | Allgeier et al. | |
| 2011/0236294 A1* | 9/2011 | Svagin | C01C 1/006 423/352 |
| 2011/0284121 A1* | 11/2011 | Johannessen | B01D 53/0454 141/4 |
| 2012/0045379 A1* | 2/2012 | Johannessen | B01D 53/90 423/235 |
| 2012/0061397 A1* | 3/2012 | Fruchart | C01B 3/0005 220/560.04 |
| 2012/0072135 A1* | 3/2012 | Quaade | C01C 1/006 702/55 |
| 2014/0205529 A1* | 7/2014 | Kindbeiter | F17C 11/00 423/352 |

FOREIGN PATENT DOCUMENTS

| | | |
|---|---|---|
| WO | 2009/057127 A1 | 5/2009 |
| WO | 2010/025948 A1 | 3/2010 |

* cited by examiner

METHOD FOR FILLING A GAS STORAGE TANK

CROSS REFERENCE TO RELATED APPLICATIONS

This application is a National Stage of International Application No. PCT/FR2012/051841, filed Aug. 2, 2012, claiming priority from French Patent Application No. 1102515, filed Aug. 12, 2011, the contents of all of which are incorporated herein by reference in their entirety.

The present invention relates to a method for filling a storage tank with a gas initially in gaseous phase in order to store said gas in solid phase.

It is known that in order to store gases that are normally in gaseous phase under normal conditions of temperature and pressure, particularly for purposes of transport, the gases are compressed in order to change them into liquid phase, even though the quantity of gas stored in a same volume is considerably increased.

However, storage of these gases in liquid phase has various disadvantages.

A first disadvantage is the instability of the stored liquid phase, which requires the user to take precautions, particularly when it involves their transport.

A second disadvantage is related to the fact that, on the one hand, the volume of liquefied gas increases with the temperature, and on the other hand, the pressure in the storage tanks also rises and increases with the temperature, even though the tanks that contain them must integrate these various factors, thus requiring the designer to give them a thickness far greater than they would have if they only contained gas in gaseous phase.

Moreover, in another domain of the technology, there are cold production systems using thermochemical means in which a reactor is placed in controlled communication with a tank containing a gas in liquid phase. When the reactor and the tank are placed in communication, the liquid gas contained in the tank is vaporized, which absorbs a certain amount of heat, so the tank is cooled and said gas is absorbed by the reagent, thus generating an exothermic chemical reaction. Consequently, the reactor is the source of a release of heat. Once the reaction is completed, if the product contained in the reactor is reheated, the gas that was absorbed by the reagent is released and this gas is then condensed in the tank. Such devices are used in certain cold production systems, particularly when it is desired to have operational autonomy with regard to a source of electricity.

In a new application, the thermochemical reaction used previously can be implemented to produce cold, in order to store a gas in solid phase that was initially in gaseous phase. To that end, the reactor of such a device is used as the storage tank for the gas. Indeed, it has been found that when all of the gas in gaseous phase has reacted with the reagent, the result is a reaction product that forms a solid compound, and it is that solid compound that is stored.

Thus for example, in the case of a reagent composed of calcium chloride and a gas consisting of ammonia, this thermochemical reaction is as follows:

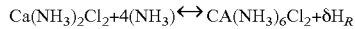

$$Ca(NH_3)_2Cl_2 + 4(NH_3) \leftrightarrow Ca(NH_3)_6Cl_2 + \delta H_R$$

and the reaction product obtained is solid and composed of calcium chloride.

However, to apply the present reaction to the domain of storing gas, the largest possible quantity of gas should be stored in order for it to be cost-effective. Now, it is known that in practice, a reagent is used that is mixed with a product called "matrix binder," which is intended to provide two functions.

A first function of the matrix binder is to allow free circulation of the gas inside the reagent. Indeed, it is known that for all of the reagent to be able to react with the gas, it is essential that the gas be able to come into contact with all of its "mass." This is why, in cold production techniques that use this same type of thermochemical reaction, it has been proposed to use a matrix binder that is preferably composed of expanded natural graphite and that forms with the reagent a reactive mixture, particularly in the form of a reactive core, through which the gas can freely move.

A second function of the matrix binder is to evacuate the heat produced by the thermochemical reaction. Otherwise, the reaction would be stopped before it is complete. Thus, the matrix binder must have good thermal conductivity, which is the case with the aforementioned graphite.

It has been found that when the type of thermochemical reaction that was previously used in cold production is used for storing gas, it is important to use a reactive mixture with a much higher proportion of reagent, i.e., on the order of 85% to 96% by weight, and preferably on the order of 94%.

It will be understood that under these conditions, the filling of a reactive mixture by the gas in gaseous phase is all the more difficult because, in order not to cause irreversible deterioration of the reagent, the liquid gas must be kept from coming into contact with it.

A purpose of the present invention is to propose a method making it possible to optimally carry out such a filling of the reactive mixture by the gas to be stored so that the user is able to control the two essential parameters of this operation, to with, the filling time and the fact that at no time during the filling operation will the liquefied gas be able to penetrate into the storage tank.

Thus, an object of the present invention is a method of filling a tank with a gas in gaseous phase in order to store said gas in solid phase, said storage tank containing a reagent for that purpose, the reagent and the gas being such that, when they are placed in the presence of each other, a thermochemical reaction occurs, resulting in the absorption of the gas by the reagent and the production of a solid reaction product, and conversely, a desorption reaction occurs of the gas absorbed by the reagent, resulting from the application of heat to said reagent when it has absorbed the gas, characterized in that said gas is introduced into the storage tank:

either at a filling pressure that is equal to the equilibrium pressure of the reagent at the filling temperature plus α times the difference between the saturation vapor pressure of the gas at the filling temperature and the equilibrium pressure of the reagent at that same temperature; the value of α falling between 0.1 and 0.9, and preferably being equal to 0.5, or at a filling temperature that is equal to the vaporization temperature of the gas at the filling pressure plus β times the difference between the equilibrium temperature of the reagent at the filling pressure and the vaporization temperature of the gas at that same pressure; the value of β falling between 0.1 and 0.9, and preferably being equal to 0.5.

In one particularly interesting mode of implementation of the invention, the filling pressure of the gas will be regulated by adjusting the temperature of the storage tank and the temperature of the container containing the gas. To do this, during the filling:

the storage tank and the container containing the gas will be kept at a constant temperature, for a given filling temperature, the holding temperature of the container containing the gas will be equal to the vaporization temperature of the gas at the filling pressure.

In particular, said holding temperature may be obtained by immersion of the storage tank and/or of the container containing the gas in a bath thermostatically controlled at the desired temperature. A collar at a regulated temperature can also be placed around the tank and/or container that is to be maintained at a constant given temperature.

In order to allow good circulation of the gas in the mass of the reagent, the reagent can be mixed with a "matrix binder" in order to constitute a mixture called "reactive mixture." This matrix binder can advantageously be composed of expanded natural graphite, ensuring that the apparent density of the reactive mixture composed of the expanded natural graphite and the reagent falls between 40 kg/m$^3$ and 120 kg/m$^3$, and preferably on the order of 50 kg/m$^3$.

The gas to be stored may consist of ammonia and the reagent may in particular consist of salts such as alkalines, alkaline-earth, or metals such as, in particular, calcium chloride, barium chloride or manganese chloride.

Preferably, a reactive mixture will be used in which the proportion by weight of the reagent will be between 50% and 98%, and will preferably be on the order of 94%.

An object of the present invention is also a facility for filling a storage tank with a gas in gaseous phase contained in a container for storage in solid phase in the storage tank, to that end said tank containing a reagent, the reagent and the gas being such that, when they are in the presence of each other, a thermochemical reaction occurs resulting in the absorption of the gas by the reagent and the production of a solid reaction product, and conversely, a desorption reaction occurs of the absorbed gas by the reagent resulting from the application of heat to said reagent when it has absorbed the gas, characterized in that it includes means that make it possible, during the filling of the storage tank:

to maintain the storage tank and the container containing the gas at a constant temperature, for a given filling temperature, to regulate the temperature of the container containing the gas at a value equal to that of the vaporization temperature of the gas at the filling pressure.

Said means for maintaining temperature, during the filling of the storage tank, may be composed of thermostatically controlled baths in which the storage tank and/or the container containing the gas is immersed.

Figure 2:
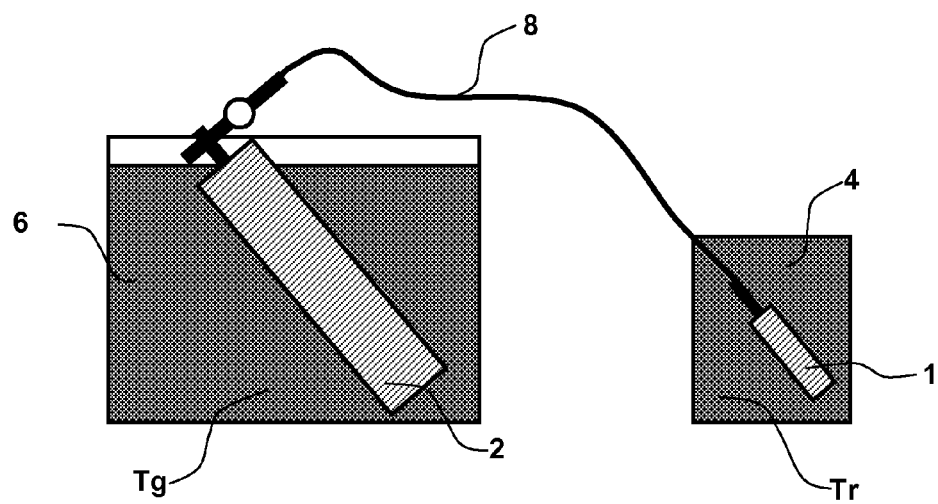
Figure 3:
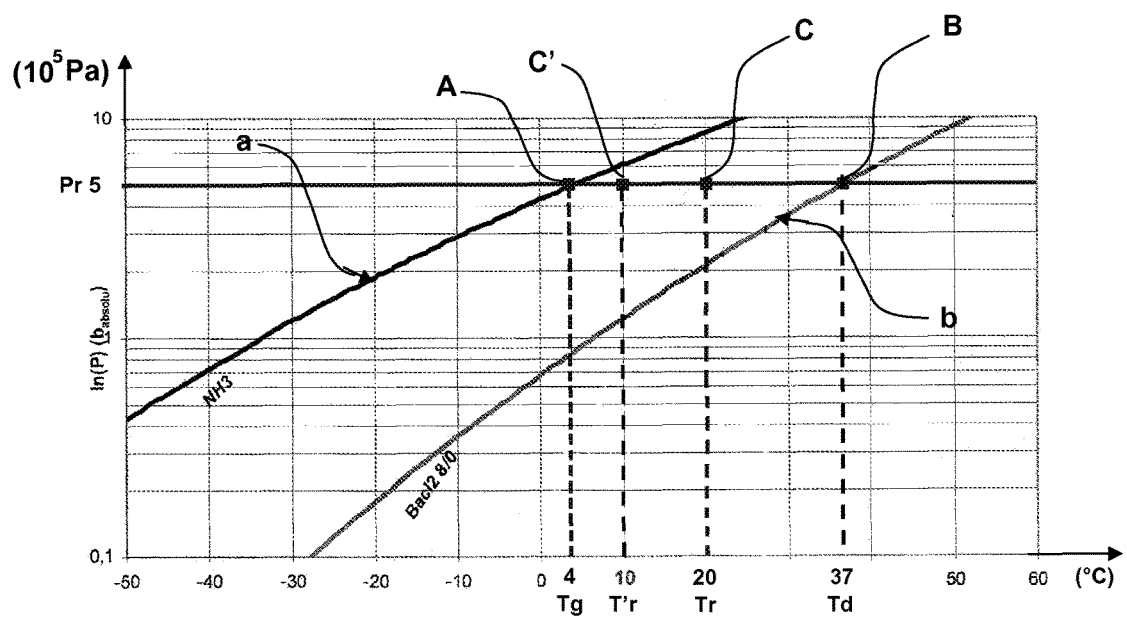

A description will now be provided, by way of non-limiting example, of one form of execution of the present invention, with reference to the appended drawing in which:

FIG. 1 is a pressure-temperature diagram representing the curves of the change of state of the ammonia and decomposition of the barium chloride used in a first mode of implementation of the invention, FIG. 2 is a diagrammatic representation of a filling facility according to the invention, FIG. 3 is a pressure-temperature diagram representing the curves of the change of state of the ammonia and of decomposition of the barium chloride used in a second mode of implementation of the invention.

In the first example of implementation of the invention, a tank 1 is to be filled with ammonia gas in order to store it in solid phase in said tank.

Said storage tank 1 contains a reagent, in this instance barium chloride, for the purpose of reacting with the ammonia and producing a solid reaction product according to the reaction:

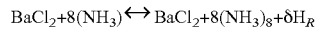

$$BaCl_2 + 8(NH_3) \leftrightarrow BaCl_2 + 8(NH_3)_8 + \delta H_R$$

The reagent is mixed with a matrix binder, the purpose of which, as previously mentioned, is to allow free circulation of the gas to be stored and good contact thereof with the mass of the reagent, and on the other hand to evacuate the heat produced by the reaction. The mixture composed of the reagent and the matrix binder will be designated as reactive mixture.

Tests carried out by the applicant have resulted in finding that, to store a quantity of gas that is optimal with regard to the storage volume, the proportion of reagent in the reactive mixture should be far greater than what is used in cold production devices using a thermochemical reaction of the same type.

Thus, in these latter devices, the proportion $T$ of reagent is on the order of 75% to 78%, that is, the reactive mixture contains by weight 75% to 78% reagent and 25% to 22% expanded natural graphite.

According to the invention, a reactive mixture is used in which the proportion by weight of reagent is between 85% and 96% and preferably on the order of 94%. The apparent density of the reactive mixture composed of expanded natural graphite and the reactant salt will fall between 40 and 120 kg/m$^3$ and preferably on the order of 50 kg/m$^3$. Under these conditions, it is known that a quantity of 500 g ammonia can be stored in a volume of one liter of reactive mixture.

The method of filling according to the invention makes it possible to control the filling speed in order to fill the reactive mixture with the gas to be stored as quickly as possible, without the gas at any time changing to liquid phase, which would dissolve the reagent and thus irreversibly deteriorate it.

Represented in FIG. 1 is a curve a that is representative of the change of state of the gas with which the storage tank 1 is to be filled, i.e., the ammonia, and a curve b that is representative of the decomposition of the reagent composed of barium chloride, as a function of the temperature and pressure.

In this mode of implementation of the invention, a filling temperature $T_r$ is chosen, equal for example to 22° C., and the segment AB between point A representing the saturation vapor pressure of the gas at that temperature and point B that represents the decomposition temperature of the reagent, i.e., the barium chloride, at that same temperature, is taken into consideration. A point C called filling point is chosen on said segment AB. Based on the choice of said filling point, the filling can be optimally controlled in accordance with the needs imposed by the selected application.

Thus, the closer the filling point C is to the curve a, the faster the filling of the storage tank will be, but the risk increases of allowing drops of liquid into it.

Therefore, if for a given application, the filling time of the storage tank 1 is not vital, but it is essential that not a drop of liquid gas can penetrate the tank, then a filling point C is chosen, for example midway between points A and B, as represented in FIG. 1.

Under these conditions, it can be seen in FIG. 1 that for the filling temperature $T_r$ of 22° C. and an operating point C midway between A and B, the pressure is 6.10$^5$ Pa, which represents the filling pressure $P_r$. For ammonia, at said pressure $P_r$, the vaporization temperature is 10° C.

Under these conditions, according to the present invention, to fill the storage tank 1 with ammonia so that at no time during the course of the filling operation does liquid gas penetrate into said tank, said tank is brought to and maintained at a filling temperature $T_r$ of 22° C. and the container 2 containing the ammonia is brought to and maintained at a temperature $T_g$ of 10° C., equal to its vaporization temperature at the filling pressure $P_r$.

To accomplish this, as represented in FIG. 2, for example the storage tank 1 to be filled is immersed in a vessel 4 containing a bath thermostatically controlled at the temperature $T_r$ of 22° C. and the container 2 containing the ammonia is immersed in another vessel 6 containing a bath thermostatically controlled at the temperature $T_g$ of 10° C., and the storage tank 1 and the container 2 are placed in communication by a conduit 8.

According to the invention, maintaining the storage tank 1 at temperature as well as the container 2 containing the ammonia can be done with means other than thermostatically controlled baths, for example by heating or cooling collars.

Respective curves can be defined for which all of the filling points $\underline{C}$ are located in a specific position on the segment AB, and particularly in the middle thereof.

Represented in FIG. 1 is a curve $\underline{d}$ on which all of the filling points $\underline{C}$ are in the middle position.

A second filling point C' is placed thereon, which corresponds to another filling temperature T'r, 25° C., and a filling pressure P'r of $8.10^5$ is therefore obtained for which the vaporization temperature of the ammonia T'g is equal to 15° C. Under these conditions, the storage tank 1 will be maintained at a temperature T'r of 25° C. and the container 2 containing the ammonia at a temperature T'g of 15° C.

Thus, as mentioned before, and depending on the applications, the filling point $\underline{C}$ can be moved on the segment AB and the limits of this positioning can be such that AC and BC are ≥AB/10.

Under these conditions, $P_r$ being the filling pressure of the storage tank 1, $P_e$ being the equilibrium pressure of the reagent at the filling temperature $T_r$ and $P_s$ being the saturation vapor pressure of the gas at the filling temperature $T_r$:

$$Pr = Pe + \alpha(Ps - Pe) \text{ where } 0.1 < \alpha < 0.9$$

In another mode of implementation of the present invention and as represented in FIG. 3, a filling pressure $P_r$ is chosen, for example of $5.10^5$ Pa and the segment AB is considered between point $\underline{A}$, representing the vaporization temperature $T_g$ of the gas (4° C.) at that pressure, and point $\underline{B}$ representing the decomposition temperature $T_d$ of the reagent (37° C.) at that same pressure. A filling point $\underline{C}$ is chosen on said segment AB. Based on the position of point $\underline{C}$ on the segment AB, the filling will be able to be controlled optimally in accordance with the constraints specific to the chosen application, as in the preceding mode of implementation. Thus, AC and BC>=AB/10.

Under these conditions, $T_r$ being the filling temperature of the storage tank 1, Tg being the vaporization temperature of the gas at the filling pressure Pr, Te being the equilibrium temperature of the reagent at the filling pressure Pr, and Tg being the vaporization temperature of the gas at that same pressure:

$$Tr = Tg + \beta(Td - Tg) \text{ where } 0.1 < \beta < 0.9$$

Thus, if for a given application, the filling time of the storage tank 1 is not vital, but it is essential that not a drop of the liquid gas penetrate into said tank, a filling point $\underline{C}$ will be chosen that is situated, for example, midway between the points $\underline{A}$ and $\underline{B}$. Under these conditions, for a filling pressure $P_r$ of $5.10^5$ Pa, the filling temperature $T_r$ at which the storage tank 1 will be maintained during the filling operation will be 20° C. and the temperature $T_g$ at which the container 2 containing the gas will be maintained will therefore be 4° C.

However, if for another application, the filling time is vital, then an operation point $\underline{C'}$ closer to point $\underline{A}$ will be chosen, with the risk of allowing a few drops of liquid gas into the storage tank 1, obviously to the detriment of the working life of the reagent. Under these conditions, the temperature T', at which the storage tank 1 will be maintained during filling, will then be 10° C.

The invention claimed is:

1. A method of filling a storage tank with a gas, the gas being in gaseous phase in order to store the gas in solid phase, the method comprising:
   providing the storage tank, the storage tank containing a reagent, the reagent and the gas being such that, when placed in the presence of each other, a thermochemical reaction occurs, resulting in the absorption of the gas by the reagent and the production of a solid reaction product, and conversely, a desorption reaction occurs of the gas absorbed by the reagent resulting from the application of heat to the reagent when the reagent has absorbed the gas, the absorption and desorption reactions resulting in an equilibrium occurring at an equilibrium pressure and an equilibrium temperature;
   wherein the gas is introduced into the storage tank at a filling temperature and at a filling pressure, the gas showing a saturation vapor pressure at the filing temperature and a vaporization temperature at the filing pressure, the filling pressure being equal to the equilibrium pressure of the reagent at the filling temperature plus α times the difference between the saturation vapor pressure of the gas at the filling temperature and the equilibrium pressure of the reagent at the filling temperature; the value of a falling between 0.1 and 0.9 or the filling temperature being equal to the vaporization temperature of the gas at the filling pressure plus β times the difference between the equilibrium temperature of the reagent at the filling pressure and the vaporization temperature of the gas the filling pressure; the value of β falling between 0.1 and 0.9.

2. The filling method according to claim 1, wherein the gas is contained in a container before entering the storage tank, the storage tank has a temperature, the container has a temperature, and the filling pressure is regulated by adjusting the temperature of the storage tank and/or the temperature of the container.

3. The filling method according to claim 2, wherein when filling the storage tank at a given filling temperature, the gas shows a vaporization temperature, wherein the storage tank and the container are kept at a constant temperature, wherein the container is kept at the constant temperature, which is equal to the vaporization temperature of the gas at the given filling pressure.

4. The filling method according to claim 3, wherein the constant temperature is obtained by immersing the storage tank and/or the container in a thermostatically controlled bath.

5. The filling method according to claim 1, wherein the reagent comprises a matrix binder.

6. The filling method according to claim 5, wherein the matrix binder is composed of expanded natural graphite.

7. The filling method according to claim 6, wherein the expanded natural graphite has an apparent density falling between 40 kg/m$^3$ and 120 kg/m$^3$.

8. The filling method according to claim 1, wherein the gas is ammonia.

9. The filling method according to claim 5, wherein the proportion by weight of the reagent in a reactive mixture including the reagent and matrix binder is between 50% and 98%.

10. The filling method according to claim 1, wherein the reagent comprises alkaline salts, alkaline-earth salts, or metal salts.

11. The filling method according to claim 10, wherein the reagent used comprises calcium chloride, barium chloride or manganese chloride.

12. The filling method according to claim 1, wherein $\alpha$ is equal to 0.5.

13. The filling method according to claim 1, wherein $\beta$ is equal to 0.5.

14. The filling method according to claim 7, wherein the apparent density of the expanded natural graphite is equal to 50 kg/m$^3$.

15. The filling method according to claim 9, wherein the proportion by weight of said reagent is 94%.

* * * * *